US012618438B2

(12) United States Patent
Dong et al.

(10) Patent No.: US 12,618,438 B2
(45) Date of Patent: May 5, 2026

(54) SLIDING MATERIAL, BEARING, AND METHODS OF MAKING AND USING THE SAME

(71) Applicant: SAINT-GOBAIN PERFORMANCE PLASTICS CORPORATION

(72) Inventors: Jing Dong, Shrewsbury, MA (US); Nafih Mekhilef, Shrewsbury, MA (US); Vincent Dimartino, Clifton, NJ (US); Christian Murphy, Worcester, MA (US)

(73) Assignee: SAINT-GOBAIN PERFORMANCE PLASTICS CORPORATION, Malvern, PA (US)

( * ) Notice: Subject to any disclaimer, the term of this patent is extended or adjusted under 35 U.S.C. 154(b) by 607 days.

(21) Appl. No.: 18/046,346

(22) Filed: Oct. 13, 2022

(65) Prior Publication Data

US 2023/0124045 A1 Apr. 20, 2023

Related U.S. Application Data

(60) Provisional application No. 63/262,539, filed on Oct. 14, 2021.

(51) Int. Cl.
*F16C 33/12* (2006.01)
(52) U.S. Cl.
CPC .................................. *F16C 33/122* (2013.01)
(58) Field of Classification Search
CPC .......... F16C 17/02; F16C 17/04; F16C 17/10; F16C 2240/54; F16C 2326/01; F16C 33/06; F16C 33/122; F16C 33/125; F16C 33/20; F16C 33/205; F16C 33/208
See application file for complete search history.

(56) References Cited

U.S. PATENT DOCUMENTS

| | | | |
|---|---|---|---|
| 4,732,818 A | 3/1988 | Pratt et al. |
| 5,229,198 A | 7/1993 | Schroeder |
| 5,971,617 A | 10/1999 | Woelki et al. |
| 6,485,608 B1 | 11/2002 | McDonald et al. |
| 7,458,158 B2 | 12/2008 | Luo |
| 9,140,302 B2 | 9/2015 | Kane |

(Continued)

FOREIGN PATENT DOCUMENTS

| | | |
|---|---|---|
| CN | 112739922 A | 4/2021 |
| EP | 2910805 B1 | 6/2017 |

(Continued)

OTHER PUBLICATIONS

International Search Report and Written Opinion for PCT Application No. PCT/US2022/078053, mailed Feb. 9, 2023, 9 pages.

(Continued)

*Primary Examiner* — Lawrence D Ferguson
(74) *Attorney, Agent, or Firm* — Abel Schillinger, LLP; Ann Palma

(57) ABSTRACT

A sliding material including: a substrate, and a textured sliding layer overlying the substrate, where the sliding layer includes asperities including a plurality of apexes and nadirs, where 1) the sliding layer has a root mean square gradient of less than 0.064; 2) the sliding layer has an apex material portion of less than 10%; 3) the sliding layer has a nadir material portion of less than 75%, and where the textured sliding layer induces formation of a film when engaged in a rotational interface w/ another component.

19 Claims, 12 Drawing Sheets

(56) References Cited

U.S. PATENT DOCUMENTS

| | | | |
|---|---|---|---|
| 9,297,416 | B2 | 3/2016 | Ziegler et al. |
| 10,077,807 | B2 | 9/2018 | Ishii et al. |
| 2011/0049834 | A1 | 3/2011 | Natu |
| 2011/0176757 | A1 | 7/2011 | Heldmann et al. |
| 2014/0100144 | A1 | 4/2014 | Ziegler et al. |
| 2014/0335336 | A1 | 11/2014 | Wang et al. |
| 2015/0093066 | A1 | 4/2015 | Speicher et al. |
| 2017/0081522 | A1 | 3/2017 | Adam et al. |
| 2017/0314614 | A1 | 11/2017 | Inami et al. |
| 2018/0135692 | A1 | 5/2018 | Inami et al. |
| 2020/0408258 | A1 | 12/2020 | Nimura et al. |

FOREIGN PATENT DOCUMENTS

| | | | |
|---|---|---|---|
| EP | 3301126 | A1 | 4/2018 |
| FR | 2709311 | A1 | 3/1995 |
| GB | 2270720 | A | 3/1994 |
| JP | H102335 | A | 1/1998 |
| JP | 2004211859 | A | 7/2004 |
| JP | 2007084368 | A | 4/2007 |
| JP | 2012177439 | A | 9/2012 |
| JP | 2013079714 | A | 5/2013 |
| JP | 2013204646 | A | 10/2013 |
| JP | 2016205607 | A | 12/2016 |
| KR | 1020200107870 | A | 9/2020 |
| WO | 200240743 | A1 | 5/2002 |
| WO | 2019181131 | A1 | 9/2019 |
| WO | 2021113599 | A1 | 6/2021 |
| WO | 2023064861 | A1 | 4/2023 |

OTHER PUBLICATIONS

Gaurniflon, "High Performance Films: Specialty Skived and Extruded Fluoropolymer Films," HPF High Performance Films Catalogue, Nov. 2016, 9 pages.

Professional Plastics, "PPS Film (Polyphenylene Sulfide)," <https://www.professionalplastics.com/PPS_Film>, 2 pages.

Amazon, <https://www.amazon.com/Electrical-Tape-PAI-Polyamide-Imide-Adhesive-Tapes/s?ie=UTF8&page=1&rh=n%3A256161011%2Cp_n_feature_seven_browse-bin%3A5485610011>, 6 pages.

Yousan Tape, Adhesive Tape Wholeset Solution Supplier Polyimide Tape, <http://www.ppptape.com/>, 3 pages.

3M Science, UHMW PE Film Tape 5421, <https://www.3m.com/3M/en_US/p/d/b40069119/>, 8 pages.

CS Hyde Company, Acetal/POM Tape, <https://catalog.cshyde.com/viewitems/tapes-with-psa/all-categories-tapes-with-adhesive-acetal-pom-tape>, 2 pages.

Picken, S.J., "Applications of Liquid Crystal Polymers: Part 1: Fibre Spinning," Liquid Crystals Today, pp. 12-15, vol. 6, 1 (1996) <https://www.tandfonline.com/doi/pdf/10.1080/13583149608047635>.

Biron, Michel, "Composites," Thermosets and Composites: Material Selection, Applications, Manufacturing, p. 462 (2004).

Summarized Product Data, <https://www.cordis.europa.eu/docs/results/323/323420/final1-main-s-and-t-only-images.pdf>, 10 pages.

SLIDING MATERIAL, BEARING, AND METHODS OF MAKING AND USING THE SAME

CROSS-REFERENCE TO RELATED APPLICATION(S)

This application claims priority under 35 U.S.C. § 119(e) to U.S. Provisional Application No. 63/262,539, entitled "SLIDING MATERIAL, BEARING, AND METHODS OF MAKING AND USING THE SAME," by Jing DONG et al., filed Oct. 14, 2021, which is assigned to the current assignee hereof and incorporated herein by reference in its entirety.

FIELD OF THE DISCLOSURE

This disclosure generally relates to sliding material and, in particular, to a sliding material used in bearings and methods of making and using the same.

BACKGROUND

Commonly, sliding members including sliding materials constrain relative movement to the desired motion and reduce friction between moving parts. One type of sliding member may be located in a gap between the outer surface of a first component and the inner surface of the bore of a second component within an assembly. Exemplary assemblies may include door, hood, tailgate, and engine compartment hinges, seats (e.g., seat recliners), steering columns, flywheels, driveshaft assemblies, or may include other assemblies notably those used in automotive applications. Sometimes, there exists a need to have certain sliding properties across components such as the first component (such as a shaft) and the second component (such as a housing) in such an assembly. Therefore, there exists is an ongoing need for improved sliding members and sliding materials that provide improved sliding properties while maintaining a longer lifetime of the assembly.

SUMMARY

Embodiments of the invention may include: a sliding material including: a substrate, and a textured sliding layer overlying the substrate, where the sliding layer includes asperities including a plurality of apexes and nadirs, where the sliding layer has a root mean square gradient of less than 0.064, where the textured sliding layer induces formation of a film when engaged in a rotational interface w/ another component.

Embodiments of the invention may include: A sliding material including: a substrate, and a textured sliding layer overlying the substrate, where the sliding layer includes asperities including a plurality of apexes and nadirs, where the sliding layer has an apex material portion of less than 10% where the textured sliding layer induces formation of a film when engaged in a rotational interface w/ another component.

Embodiments of the invention may include: A sliding material including: a substrate, and a textured sliding layer overlying the substrate, where the sliding layer includes asperities including a plurality of apexes and nadirs, where the sliding layer has a nadir material portion of less than 75%, where the textured sliding layer induces formation of a film when engaged in a rotational interface w/ another component.

Embodiments of the invention may include: A bearing including: a substrate, and a textured sliding layer overlying the substrate, where the sliding layer includes asperities including a plurality of apexes and nadirs, where the sliding layer has a root mean square gradient of less than 0.064, where the textured sliding layer induces formation of a film when engaged in a rotational interface w/ another component.

Embodiments of the invention may include: A bearing including: a substrate, and a textured sliding layer overlying the substrate, where the sliding layer includes asperities including a plurality of apexes and nadirs, where the sliding layer has an apex material portion of less than 10% where the textured sliding layer induces formation of a film when engaged in a rotational interface w/ another component.

Embodiments of the invention may include: A bearing including: a substrate, and a textured sliding layer overlying the substrate, where the sliding layer includes asperities including a plurality of apexes and nadirs, where the sliding layer has a nadir material portion of less than 75%, where the textured sliding layer induces formation of a film when engaged in a rotational interface w/ another component.

Embodiments of the invention may include: An assembly including: a first component; a second component; and a bearing located between the first component and the second component, the bearing including: a substrate, and a textured sliding layer overlying the substrate, where the sliding layer includes asperities including a plurality of apexes and nadirs, where the sliding layer has a root mean square gradient of less than 0.064, where the textured sliding layer induces formation of a film when engaged in a rotational interface w/ another component.

Embodiments of the invention may include: An assembly including: a first component; a second component; and a bearing located between the first component and the second component, the bearing including: a substrate, and a textured sliding layer overlying the substrate, where the sliding layer includes asperities including a plurality of apexes and nadirs, where the sliding layer has an apex material portion of less than 10% where the textured sliding layer induces formation of a film when engaged in a rotational interface w/ another component.

Embodiments of the invention may include: An assembly including: a first component; a second component; and a bearing located between the first component and the second component, the bearing including: a substrate, and a textured sliding layer overlying the substrate, where the sliding layer includes asperities including a plurality of apexes and nadirs, where the sliding layer has a nadir material portion of less than 75%, where the textured sliding layer induces formation of a film when engaged in a rotational interface w/ another component.

Embodiments of the invention may include: A method including: providing a substrate; applying a sliding layer to the substrate to provide a laminate with a textured sliding layer overlying the substrate, where the sliding layer includes asperities including a plurality of apexes and nadirs, where the sliding layer has a root mean square gradient of less than 0.064, where the textured sliding layer induces formation of a film when engaged in a rotational interface w/another component.

Embodiments of the invention may include: A method including: providing a substrate; applying a sliding layer to the substrate to provide a laminate with a textured sliding layer overlying the substrate, where the sliding layer includes asperities including a plurality of apexes and nadirs, where the sliding layer has an apex material portion of less than 10%, where the textured sliding layer induces formation of a film when engaged in a rotational interface w/another component.

Embodiments of the invention may include: A method including: providing a substrate; applying a sliding layer to the substrate to provide a laminate with a textured sliding layer overlying the substrate, where the sliding layer comprises asperities comprising a plurality of apexes and nadirs, where the sliding layer has a nadir material portion of less than 75%, where the textured sliding layer induces formation of a film when engaged in a rotational interface w/another component.

BRIEF DESCRIPTION OF THE DRAWINGS

The present disclosure may be better understood, and its numerous features and advantages made apparent to those skilled in the art by referencing the accompanying drawings.

Figure 1:
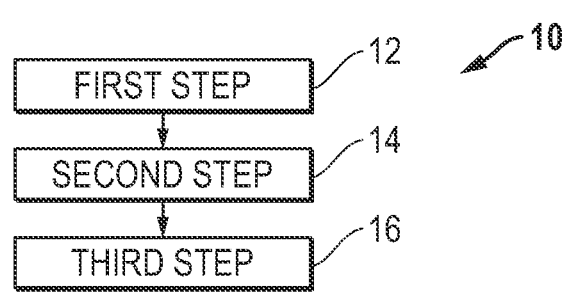
FIG. 1 includes a method of producing a sliding material in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DESCRIPTION OF THE DRAWING(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present), and B is false (or not present), A is false (or not present), and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sliding material arts.

Embodiments described herein are generally directed to a textured sliding layer material and methods of creating and using a textured sliding material on a bearing within an assembly.

For purposes of illustration, FIG. 1 includes a method of producing a sliding material in accordance with embodiments described above. The forming process 10 may include a first step 12 of providing a base material, a second step 14 of coating the base material with a sliding coating to form a sliding material and a third step 16 of forming the sliding material into a bearing.

Referring to the first step 12, the base material may be a substrate. In an embodiment, the substrate can at least partially include a metal. According to certain embodiments, the metal may include iron, bronze, magnesium, zinc, copper, titanium, tin, aluminum, alloys thereof, or may be another type of material. More particularly, the substrate can at least partially include a steel, such as, a stainless steel, carbon steel, or spring steel. For example, the substrate can at least partially include a 301 stainless steel. The 301 stainless steel may be annealed, ¼ hard, ½ hard, ¾ hard, or full hard. Moreover, the steel can include stainless steel including chrome, nickel, or a combination thereof. A particular stainless steel is 301 stainless steel. The base material and/or substrate can be of any structure or shape. In embodiments, the base material and/or substrate can be a plate, a sheet, a woven fabric, a mesh, or metal foam or combination thereof. For example, in some embodiments, the substrate may include a plate and a woven fabric. In other embodiments, the substrate may include a metal plate and a different metal overlying the metal plate. The substrate may include a woven mesh or an expanded metal grid, an expanded sheet, or a perforated sheet. Alternatively, the woven mesh can be a woven polymer mesh. In an alternate embodiment, the substrate may not include a mesh or grid.

In a number of embodiments, the substrate may be spring steel. The spring steel substrate may be annealed, ¼ hard, ½ hard, ¾ hard, or full hard. The spring steel substrate may have a tensile strength of not less than 600 MPa, such as not less than 700 MPa, such as not less than 750 MPa, such as not less than 800 MPa, such as not less than 900 MPa, or such as not less than 1000 MPa. The spring steel substrate may have a tensile strength of no greater than 1500 MPa, or such as no greater than 1250 MPa.

In other embodiments, the substrate can have a coating. The coating can be a layer of another metal or alloy. In embodiments, the coating may be a metal or alloy containing at least one of the following metals: chromium, molybdenum, tungsten, manganese, iron, ruthenium, osmium, cobalt, rhodium, iridium, nickel, palladium, platinum, copper, silver, gold, zinc, cadmium, mercury, aluminum, gallium, indium, thallium, silicon, germanium, tin, lead, antimony, and bismuth. In yet other embodiments, the coating can be a copper alloy, a copper-tin alloy, a copper-zinc alloy, a bronze, a phosphor bronze, a silicon bronze, a brass, or any combinations thereof.

Figure 2A:
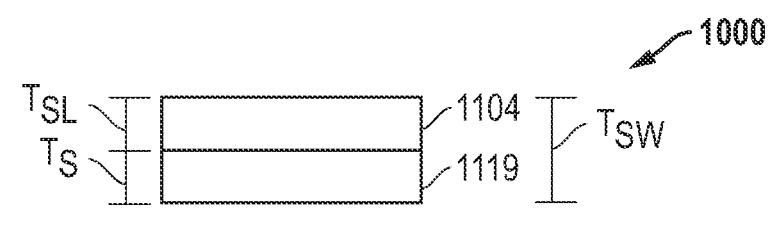
FIG. 2A includes a cross-sectional view of a sliding material in accordance with an embodiment.

FIG. 2A includes an illustration of the sliding material or composite material 1000 that may be formed according to first step 12 and second step 14 of the forming process 10 for forming a sliding material for a bearing according to embodiments described above. For purposes of illustration, FIG. 2A shows the layer-by-layer configuration of a sliding material 1000 after second step 14. In a number of embodiments, the sliding material 1000 may include a substrate 1119 (i.e., the base material provided in the first step 12) and a sliding layer 1104 (i.e., the sliding coating applied in second step 14). As shown in FIG. 2A, the sliding layer 1104 can be coupled to at least a portion of the substrate 1119. In a particular embodiment, the sliding layer 1104 can be coupled to a surface of the substrate 1119 so as to form a sliding interface with another surface of another component. The sliding layer 1104 can be coupled to the radially inner surface of the substrate 1119 so as to form a sliding interface with another surface of another component. The sliding layer 1104 can be coupled to the radially outer surface of the substrate 1119 so as to form a sliding interface with another surface of another component. In another embodiment, the substrate 1119 may be embedded within the sliding layer 1104 so as to provide sliding layer 1104 on both sides of the substrate 1119.

The sliding layer may be textured, as discussed in more detail below. In a number of embodiments, the sliding layer 1104 can include a sliding material. Sliding materials may include, for example, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoroploymer, a polyamide, a polybenzimidazole, or any combination thereof. In an example, the sliding layer 1104 includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the sliding/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the sliding/wear resistant layer includes polyketone, such as polyether ether ketone (PEEK), polyether ketone, polyether ketone ketone, polyether ketone ether ketone, a derivative thereof, or a combination thereof. In an additional example, the sliding/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The sliding layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, lead, iron, bronze, steel, spring steel, stainless steel), a metal alloy (including the metals listed), an anodized metal (including the metals listed) or any combination thereof. Fluoropolymers may be used according to particular embodiments. In an embodiment, the sliding layer 1104 may not include polytetrafluoroethylene (PTFE).

In a number of embodiments, the sliding layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, barium sulfate, zirconia, carbon black, pigments, or any combination thereof. In certain embodiments, the sliding layer 1104 may include an organic filler including polytetrafluoroethylene (PTFE), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), polyoxymethylene (POM), polyethylene (PE), UHMWPE, ethylene propylene diene, or a mixture thereof. In an embodiment, the sliding layer 1104 may include polytetrafluoroethylene (PTFE) only as a filler. Fillers can be in the form of beads, fibers, powder, mesh, or any combination thereof. The fillers may be at least 1 wt % based on the total weight of the sliding layer, such as at least 5 wt %, or even 10 wt % based on the total weight of the sliding layer.

The substrate 1119 can have a thickness Ts of at least about 0.05 mm, such as at least about 0.1 mm, at least about 0.15 mm, at least about 0.2 mm, at least about 0.25 mm, at least about 0.3 mm, at least about 0.35 mm, at least about 0.4 mm, or at least about 0.45 mm. The substrate 1119 can have a thickness Ts of not greater than about 5 mm, not greater than about 4 mm, not greater than about 3 mm, not greater than about 2.5 mm, not greater than about 2 mm, such as not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm. It will be further appreciated that the thickness Ts of the substrate 1119 may be any value between any of the minimum and maximum values noted above. The thickness of the substrate 1119 may be uniform, i.e., a thickness at a first location of the substrate 1119 can be equal to a thickness at a second location therealong. The thickness of the substrate 1119 may be non-uniform, i.e., a thickness at a first location of the substrate 1119 can be different from a thickness at a second location therealong.

The sliding layer 1104 can have a thickness $T_{SL}$ of at least about 0.05 mm, such as at least about 0.1 mm, at least about 0.15 mm, at least about 0.2 mm, at least about 0.25 mm, at least about 0.3 mm, at least about 0.35 mm, at least about 0.4 mm, or at least about 0.45 mm. The sliding layer 1104 can have a thickness $T_{SL}$ of not greater than about 5 mm, not greater than about 4 mm, not greater than about 3 mm, not greater than about 2.5 mm, not greater than about 2 mm, such as not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm. It will be further appreciated that the thickness $T_{SL}$ of the sliding layer 1104 may be any value between any of the minimum and maximum values noted above. The thickness of the sliding layer 1104 may be uniform, i.e., a thickness at a first location of the sliding layer 1104 can be equal to a thickness at a second location therealong. The thickness of the sliding layer 1104 may be non-uniform, i.e., a thickness at a first location of the sliding layer 1104 can be different from a thickness at a second location therealong. It can be appreciated that different sliding layers 1104 may have different thicknesses. The sliding layer 1104 may overlie one major surface of the substrate 1119, shown, or overlie both major surfaces. The substrate 1119 may be at least partially encapsulated by the sliding layer 1104. That is, the sliding layer 1104 may cover at least a portion of the substrate 1119. Axial surfaces of the substrate 1119 may be exposed from the sliding layer 1104.

Figure 2B:
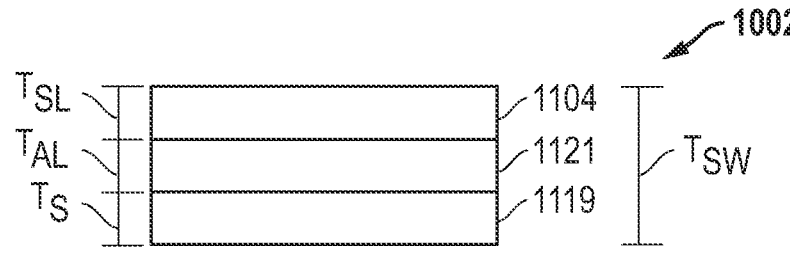
FIG. 2B includes a cross-sectional view of a sliding material in accordance with an embodiment.

FIG. 2B includes an illustration of an alternative embodiment of the sliding material or composite material that may be formed according to first step 12 and second step 14 of the forming process 10 for forming a sliding material for a bearing according to embodiments described above. For purposes of illustration, FIG. 2B shows the layer-by-layer configuration of a sliding material 1002 after second step 14. According to this particular embodiment, the sliding material 1002 may be similar to the composite material 1000 of FIG. 2A, except this sliding material 1002 may also include at least one adhesive layer 1121 that may couple the sliding layer 1104 to the substrate 1119 (i.e., the base material provided in the first step 12) and a sliding layer 1104 (i.e., the sliding coating applied in second step 14). In another alternate embodiment, the substrate 1119, as a solid component, woven mesh or expanded metal grid, may be embedded between at least one adhesive layer 1121 included between the sliding layer 1104 and the substrate 1119.

The adhesive layer 1121 may include any known adhesive material common to the bearing arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C.

The adhesive layer 1121 can have a thickness $T_{AL}$ of between about 1 micron to about 80 microns, such as between about 10 microns and about 50 microns, such as between about 20 microns and about 40 microns. In a number of embodiments, the adhesive layer 1121 may have a thickness $T_{AL}$ of between about 3 and 20 microns. In a number of embodiments, the adhesive layer 1121 may have a thickness $T_{AL}$ of between about 10 and 60 microns. It will be further appreciated that the thickness $T_{AL}$ of the adhesive layer 1121 may be any value between any of the minimum and maximum values noted above. The thickness of the adhesive layer 1121 may be uniform, i.e., a thickness at a first location of the adhesive layer 1121 can be equal to a thickness at a second location therealong. The thickness of the adhesive layer 1121 may be non-uniform, i.e., a thickness at a first location of the adhesive layer 1121 can be different from a thickness at a second location therealong.

The thickness of the adhesive layer 1121 can correspond essentially to the roughness of the substrate 1119, defined as the distance Rmax between the maximum profile apex height and the maximum profile nadir depth of the roughness profile of the surface of the substrate 1119. In this way, it can be ensured that a sufficiently thick adhesive layer 1121 is applied to the substrate 1119 so that a full-area adhesive bond between sliding layer 1104 and substrate 1119 is ensured. The adhesive layer 1121 should also not be made too thick. In this case, there would be a risk that, on joining the layers, parts of the adhesive layer 1121 could be pressed out from the adhesive bond or cohesive rupture could occur within parts of the adhesive layer 1121 projecting above the roughness profile of the substrate 1119 surface when the sliding material is subjected to shear stress.

For example, surface roughness of the substrate 1119 can be at least about 0.01 micron, at least about 0.02 micron, at least about 0.05 micron, at least about 0.1 micron, at least about 0.5 micron, at least about 1 micron, at least about 2 microns, at least about 5 microns, at least about 10 microns, at least about 20 microns, at least about 50 microns, at least about 100 microns, at least about 200 microns, or at least about 400 microns. In other embodiments, the surface roughness is less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, or even less than about 1 micron. In yet another embodiment, the substrate 1119 can have a surface roughness in the range from about 0.1 micron to about 400 microns, from about 0.5 micron to about 100 microns, or from about 1 micron to about 50 microns.

Further, the surface of the substrate 1119 can be treated by electrolytic zinc-plating to roughen, upgrade, or coat the surface. This is done before application of the adhesive layer 1121. In other embodiments, the surface area of the substrate 1119 can be increased by mechanical structuring. The structuring can include brush-finishing, sand-blasting, etching, perforating, pickling, punching, pressing, curling, deep drawing, decambering, incremental sheet forming, ironing, laser cutting, rolling, hammering, embossing, undercutting, and any combinations thereof. For example, embossing of a structure, allows for the possibility of intermeshing, which has a positive effect on the resulting bonding forces.

Figure 2C:
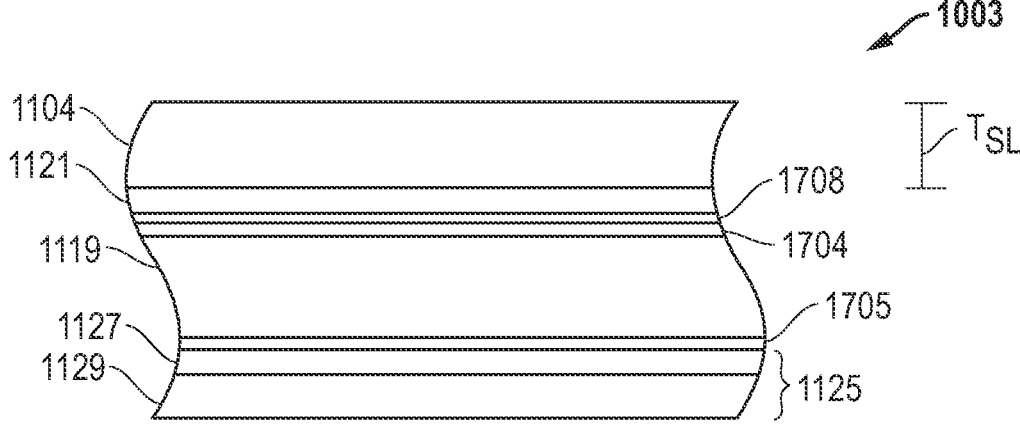
FIG. 2C includes a cross-sectional view a sliding material in accordance with an embodiment.

FIG. 2C includes an illustration of an alternative embodiment of the sliding material or composite material that may be formed according to first step 12 and second step 14 of the forming process 10 for forming a sliding material for a bearing according to embodiments described above. For purposes of illustration, FIG. 2C shows the layer-by-layer configuration of a sliding material 1003 after second step 14. According to this particular embodiment, the sliding material 1003 may be similar to the sliding material 1002 of FIG.

2B, except this sliding material 1003 may also include at least one corrosion protection layer 1704, 1705, and 1708, and a corrosion resistant coating 1124 that can include an adhesion promoter layer 1127 and an epoxy layer 1129 that may couple to the substrate 1119 (i.e., the base material provided in the first step 12) and a sliding layer 1104 (i.e., the sliding coating applied in second step 14).

The substrate 1119 may be coated with corrosion protection layers 1704 and 1705 to prevent corrosion of the sliding material 1003 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

The sliding material 1003 may further include a corrosion resistant coating 1125. The corrosion resistant coating 1125 can have a thickness of about 1 to 50 microns, such as about 5 to 20 microns, and such as about 7 to 15 microns. The corrosion resistant coating 1125 can include an adhesion promoter layer 1127 and an epoxy layer 1129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy layer 1129 can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In an embodiment, under step 14 of FIG. 1, any of the layers on the sliding material or composite material 1000, 1002, 1003, as described above, can each be disposed in a roll and peeled therefrom to join together under pressure, at elevated temperatures (hot or cold pressed or rolled), by an adhesive, or by any combination thereof. Any of the layers of the sliding material 1000, as described above, may be laminated together such that they at least partially overlap one another. Any of the layers on the sliding material 1000, 1002, 1003, as described above, may be applied together using coating technique, such as, for example, physical or vapor deposition, spraying, plating, powder coating, or through other chemical or electrochemical techniques. In a particular embodiment, the sliding layer 1104 may be applied by a roll-to-roll coating process, including for example, extrusion coating. The sliding layer 1104 may be heated to a molten or semi-molten state and extruded through a slot die onto a major surface of the substrate 1119. In another embodiment, the sliding layer 1104 may be cast or molded.

In an embodiment, the sliding layer 1104 can be glued or otherwise adhered to the substrate 1119 to form a laminate. In an embodiment, the sliding layer 1104 or any layers can be glued or otherwise adhered to the substrate 1119 using the melt adhesive layer 1121 to form a laminate. In an embodiment, the sliding layer 1104 or any layers can be glued or otherwise adhered to the substrate 1119 as a polymer tape to form a laminate. In an embodiment, any of the intervening or outstanding layers on the material or sliding material 1000, 1002, 1003, may form the laminate. The laminate can be cut into strips or blanks that can be formed into the bearing. The cutting of the laminate may include use of a stamp, press, punch, saw, or may be machined in a different way. Cutting the laminate can create cut edges including an exposed portion of the substrate 1119.

In other embodiments, under step 14 of FIG. 1, any of the layers on the sliding material 1000, 1002, 1003, as described above, may be applied by a coating technique, such as, for example, physical or vapor deposition, spraying, plating, powder coating, or through other chemical or electrochemical techniques. In a particular embodiment, the sliding layer 1104 may be applied by a roll-to-roll coating process, including for example, extrusion coating. The sliding layer 1104 may be heated to a molten or semi-molten state and extruded through a slot die onto a major surface of the substrate 1119. In another embodiment, the sliding layer 1104 may be cast or molded.

Referring now to the third step 16 of the forming process 10 as shown in FIG. 1, according to certain embodiments, forming the sliding material 1000, 1002, 1003 into a bearing may include a cutting operation. In an embodiment, the cutting operation may include use of a stamp, press, punch, saw, deep draw, or may be machined in a different way. In a number of embodiments, the cutting operation may form a peripheral surface on the sliding material. The cutting operation may define a cutting direction initiated from a first major surface to a second major surface, opposite the first major surface, to form the peripheral surfaces or edges. Alternatively, the cutting operation may define a cutting direction initiated from the second major surface to the first major surface to form the peripheral surfaces or edges. The sliding material may now be shaped to a bearing for the desired application.

After shaping the sliding material, the sliding material or bearing may be cleaned to remove any lubricants and oils used in the forming and shaping process. Additionally, cleaning can prepare the exposed surface of the substrate for the application of the coating. Cleaning may include chemical cleaning with solvents and/or mechanical cleaning, such as ultrasonic cleaning.

As a result of the method of FIG. 1, according to embodiments described above, the sliding layer 1104, which covers the substrate 1119 in the substrate, may be textured to have microscopically minute asperities (e.g., apexes and nadirs on a surface), which forms the sliding surface, instead of variation in macroscopic thickness of the sliding layer 1104 itself. The sliding surface is one of the surfaces of the sliding layer 1104, that is, the surface on the side opposite the substrate 1119, as shown in FIG. 2C.

Figure 3:
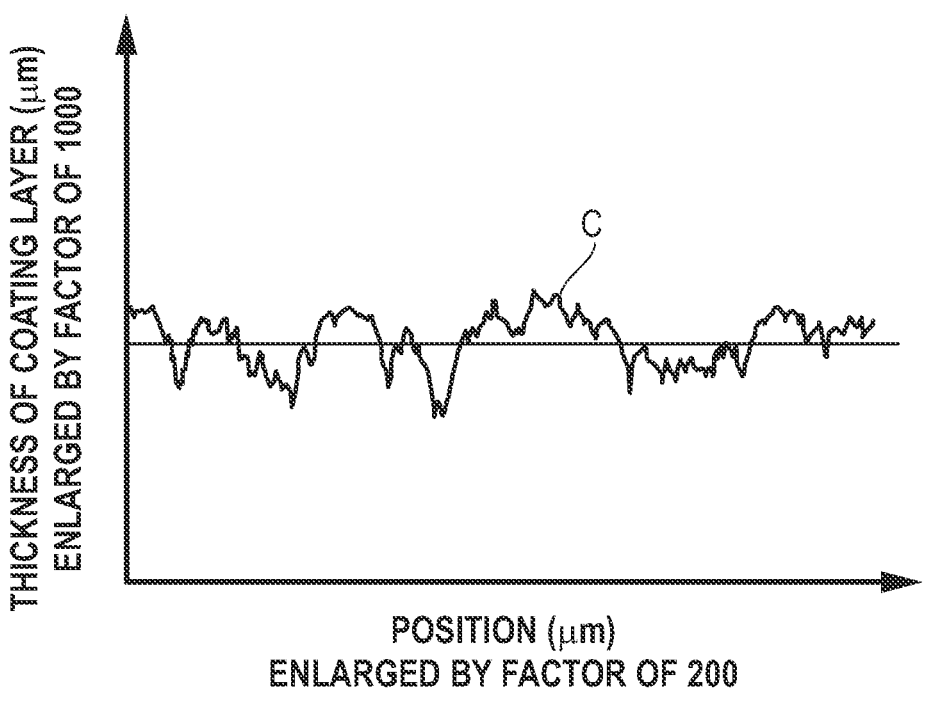
FIG. 3 is a diagrammatic view showing the shape line of the surface of a sliding material according to the embodiment.

FIG. 3 is an enlarged view with the X-axis enlarged by a factor of 200 and the Y-axis enlarged by a factor of 1000. The surface shape of the sliding layer 1104 is acquired as a shape line C shown in FIG. 3. The shape line C represents the apexes and nadirs of the surface of the sliding layer 1104 in a cross section containing a plane parallel to the thickness direction of the sliding layer 1104. The shape line C is expressed by using an X-Y coordinate system. Specifically, the X-axis represents a position between two arbitrary points, and the Y-axis represents the thickness direction of the sliding layer 1104, that is, the position in the Y-axis direction represents the depth and height of the apexes and nadirs of the surface. The shape line C therefore contains apexes and nadirs according to the surface shape of the sliding layer 1104.

Figure 4:
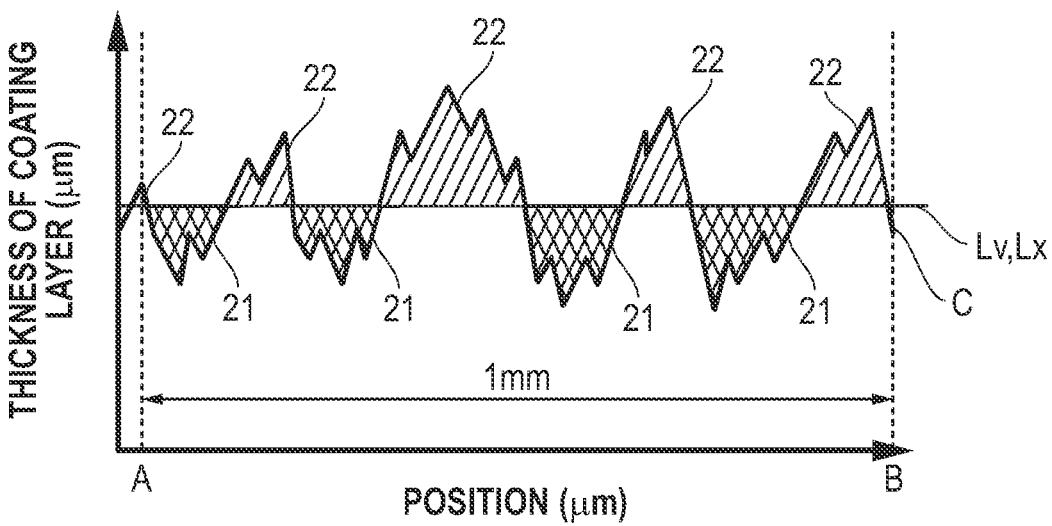
FIG. 4 is a diagrammatic view showing a simplified version of the shape line shown in FIG. 3 for the sake of illustration.

FIG. 4 diagrammatically shows a simplified version of the shape line C shown in FIG. 3 for the sake of illustration. The shape line C containing apexes and nadirs is divided by an imaginary straight line Lx, which is parallel to the X axis as a reference, into upper and lower parts in the Y-axis direction. In a case where the sliding surface of the sliding layer 1104 is microscopically flat, the sliding surface of the sliding layer 1104, the X-axis, and the imaginary straight line Lx are parallel to one another. When the shape line C is divided by the imaginary straight line Lx, recessed regions (nadirs) that protrude downward from the imaginary straight line Lx and protruding regions (apexes) that protrude upward from the imaginary straight line Lx are separated from each other. In FIG. 4, the recessed regions are "meshed," and the protruding regions are "hatched." The imaginary straight line Lx, which is so positioned that the sum S1 of the areas of the recessed regions is equal to the sum S2 of the areas of the protruding regions, is defined as a protrusion and recess average line Lv. That is, across the sliding surface of the sliding layer 1104, the sum S1 of the areas of the recessed regions that protrude downward from the protrusion and recess average line Lv is equal to the sum S2 of the areas of the protruding regions that protrude upward from the protrusion and recess average line Lv (S1=S2). The regions that protrude downward from the protrusion and recess average line Lv are defined as nadirs 21, and the regions that protrude upward from the protrusion and recess average line Lv are defined as apexes 22.

In the present embodiment, the X-axis is defined in the center position in the circumferential direction and the radial direction of the surface of the sliding layer 1104 or sliding material and defined as the direction tangential to the circumferential direction for measurement. The arbitrary two points can be arbitrarily adjusted in terms of the number of locations, the positions, and the direction in the measurement in consideration of the application of the sliding layer 1104.

Figure 5:
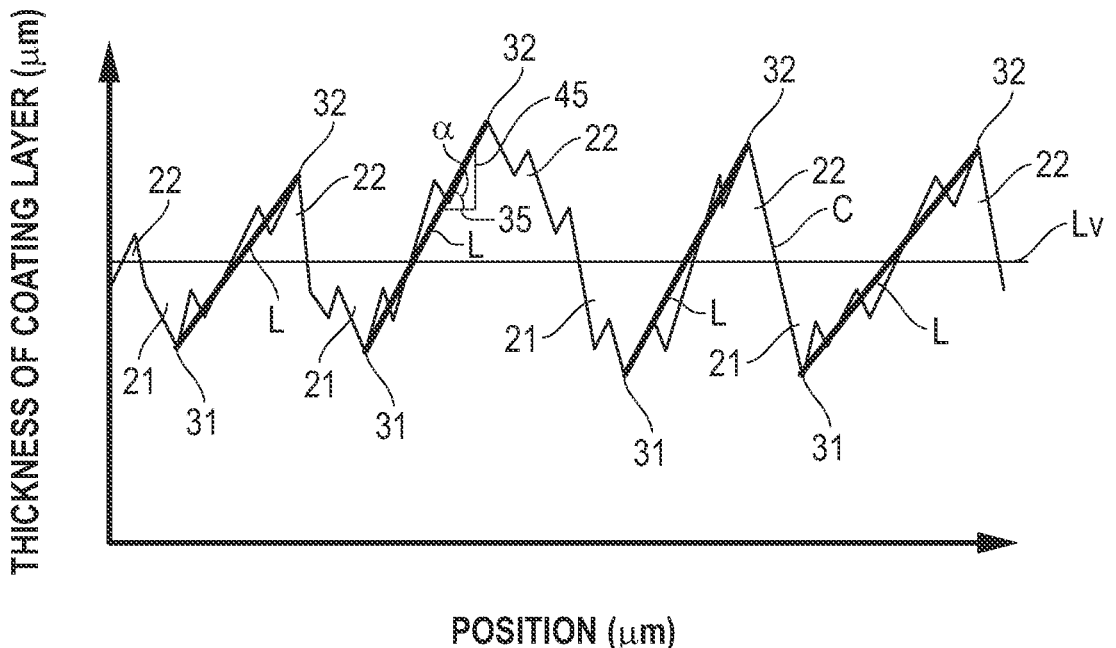
FIG. 5 is a diagrammatic view showing straight lines that connect the bottoms of recesses and the apexes of protrusions to each other along the shape line shown in FIG. 3.

FIG. 5 diagrammatically shows a simplified version of the shape line C shown in FIG. 4 for the sake of illustration. In the present embodiment, the performance of the sliding layer 1104 or sliding material is further verified by using the relationship between a nadir 21 and an apex 22 adjacent to each other. Each of the nadirs 21 has a bottom 31 in the deepest position of the nadir 21, that is, in the position closest to the substrate 1119. The protrusion 22 adjacent to the nadir 21 has an apex 32 in the highest position of the apex 22, that is, in the position farthest from the substrate 1119. As described above, when a nadir 21 and an apex 22 are adjacent to each other with the protrusion and recess average line Lv therebetween, the bottom 31 of the nadir 21 and the apex 32 of the apex 22 can be connected to each other with an imaginary straight line L. The gradient of the straight line L is the value calculated by dividing a measured distance between the bottom 31 of the nadir 21 and the apex 32 of the apex 22 in the Y-axis direction, 45, by a measured distance between the bottom 31 and the apex 32 in the X-axis direction, 35. The average of the gradients of the resultant straight lines L is an average gradient SDQ or the root mean square gradient. In a number of embodiments, the root mean square gradient of the low friction material may be less than 0.064.

Further, the root mean square gradient may have an average angle $\alpha$ from the nadir to the apex. The angle $\alpha$ may be at least 0.01°, such as 0.05°, such as 0.1°, such as 0.15°, such as 0.5°, such as 1°, such as 1.5°, such as 2°, or such as 3°.

Further, the apex material portion, Smr1, may be calculated as the percentage of the low friction material that includes the apexes. In other words, the thickness of the substrate may be termed $T_S$, and Smr1 is the area material ratio that divides the reduced apexes of the total thickness of the low friction material, $T_{SL}$, from the thickness of the substrate or core surface $T_S$. The reduced apexes are the areas that are removed by initial abrasion with a neighboring component. In a number of embodiments, the apex material portion, Smr1, of the low friction material may be less than 10%.

Further, the nadir material portion, Smr2, may be calculated as the percentage of the low friction material that includes the nadirs. In other words, the thickness of the substrate may be termed $T_S$, and Smr2 is the area material ratio that divides the reduced nadirs of the total thickness of the low friction material, $T_S$ from the thickness of the substrate or core surface $T_S$. The reduced nadirs are the areas that hold liquid (e.g., grease) applied on the surface in order to improve lubricity. In a number of embodiments, the nadir material portion, Smr1, of the low friction material may be less than 75%.

The resulting textured sliding layer 1104 may have a minimum distance between at least one apex 22 of the plurality of apexes 22 and at least one nadir 21 of the plurality of nadirs 21 may be 0.05 mm.

Therefore, a method may be included according to embodiments herein. The method may include providing a substrate 1119; and applying a sliding layer 1104 to the substrate 1119 to provide a laminate with a textured sliding layer 1104 overlying the substrate 1119, where the sliding layer 1104 includes asperities including a plurality of apexes 22 and nadirs 21, where 1) the sliding layer has a root mean square gradient of less than 0.064; 2) the sliding layer has an apex material portion of less than 10%; 3) the sliding layer has a nadir material portion of less than 75%. The method may further include cutting the blank to form the laminate. The method may further include forming a semi-finished bearing from the blank.

As stated above, the sliding layer 1104 can be coupled to a surface of the substrate 1119 so as to form a sliding interface with another surface of another component. As a result of the method, the sliding layer 1104 may have a coefficient of friction of less than 0.02 with another component, as discussed in more detail below.

Figure 6:
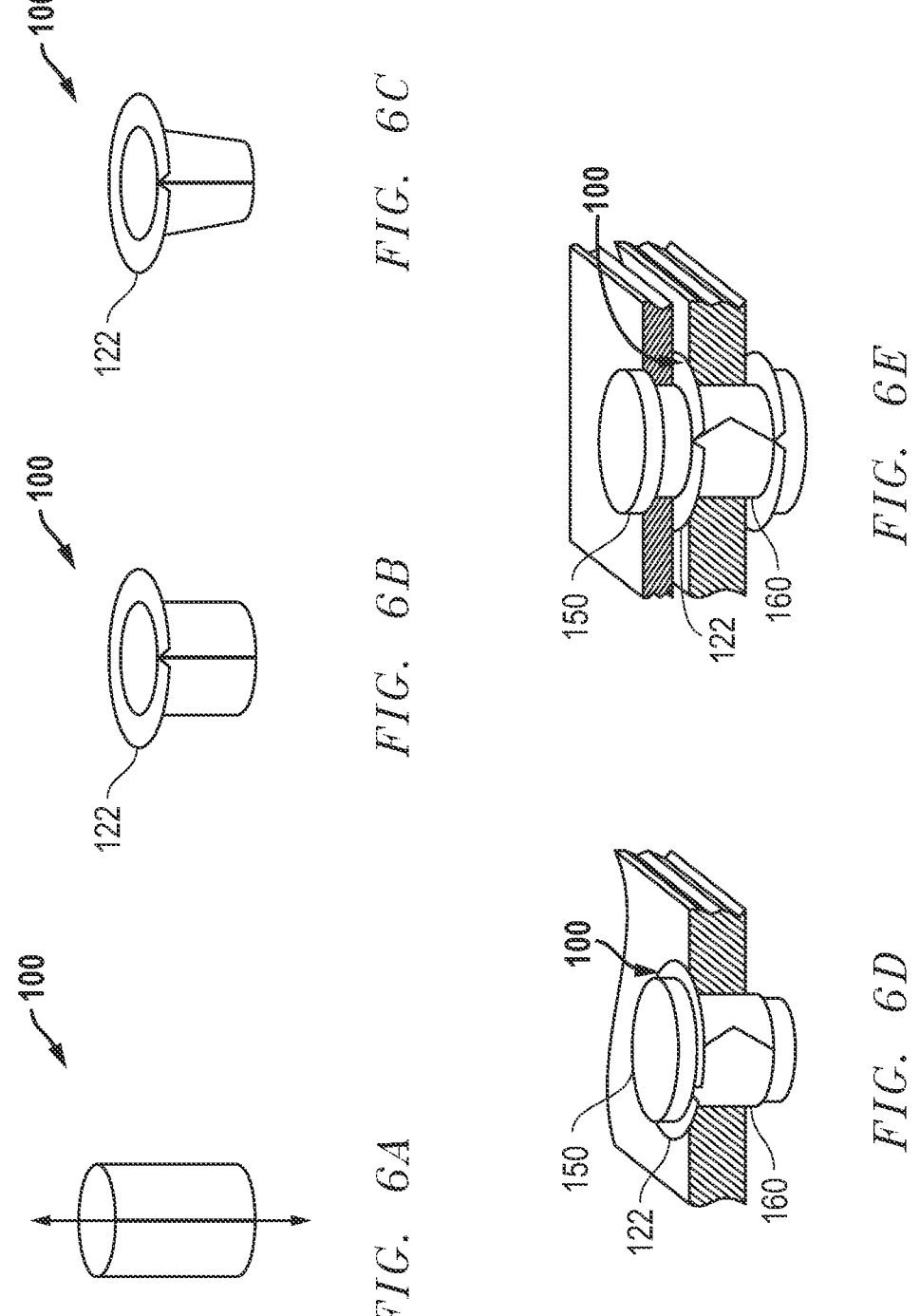
FIG. 6A includes a perspective view of one embodiment of a bearing constructed in accordance with the invention.
FIG. 6B includes a perspective view of one embodiment of a bearing constructed in accordance with the invention.
FIG. 6C includes a perspective view of one embodiment of a bearing constructed in accordance with the invention.
FIG. 6D includes a perspective view of one embodiment of a bearing within an assembly constructed in accordance with the invention.
FIG. 6E includes a perspective view of one embodiment of a bearing within an assembly constructed in accordance with the invention.

In a number of embodiments, the resulting sliding material may be formed into a bearing. For purposes of illustration, FIG. 6A illustrates a bearing (generally designated 100) shape that may be produced by rolling of an appropriately dimensioned piece of composite material 1000, 1001, 1002, 1003 which may be initially present as a blank as described above. The bearing 100 may extend in the axial direction relative to a central axis. That is, central axis may extend longitudinally along the length of the bearing 100. The bearing 100 include a generally cylindrical sidewall 102. As used herein, "generally cylindrical" refers to shape which, when positioned in a best fit cylinder having a body of revolution about an axis, deviates from the best fit cylinder by no greater than 15% at any location, no greater than 10% at any location, no greater than 5% at any location, no greater than 4% at any location, no greater than 3% at any location, no greater than 2% at any location, or no greater than 1% at any location. In an embodiment, "generally cylindrical" may refer to the generally cylindrical body 310 as assembled between inner and outer components—i.e., in the installed state. In another embodiment, "generally cylindrical" may refer to the generally cylindrical body 310 prior to assembly between inner and outer components—i.e., in the uninstalled state. In a particular embodiment, the generally cylindrical sidewall 102 may be a cylindrical sidewall having a shape corresponding to a revolution about an axis with two longitudinal planar end sections. In a number of embodiments, the blank may be rolled to form the generally cylindrical sidewall 102 that may form an annular shape. In a number of embodiments, the sidewall 102 may include a substrate 1119 and at least one low friction layer 1104 of the composite material 1000, 1001, 1002 as shown in FIGS. 2A-2C. The low friction material 1104 may cover essentially the entirety of at least one of the inner surfaces or the outer surface of the bearing 100.

For purposes of illustration, FIG. 6B illustrates a bearing (generally designated 100) shape that may be produced by rolling and flanging of an appropriately dimensioned piece of composite material 1000, 1001, 1002, 1003 which may be initially present as a blank as described above. FIG. 6B may include all of the structure and design of FIG. 6A and, for sake of brevity, the corresponding reference numerals were kept the same and refer to the same structures as those of FIG. 6A. FIG. 6B may differ from FIG. 6A in that the bearing 100 of FIG. 6B may have an annular shape that is substantially L shaped in axial-cross section, forming an annular flange 122. In other words, the bearing 100 may have an L shaped bearing cross-section extending in the radial and axial direction. Other axial cross-sectional shapes of the bearing are possible. For example, the bearing 100 may have a C shaped bearing cross-section. In a number of embodiments, the L-shape bearing 100 may be achieved by a deep-drawing process involving stamping a formed bearing 100.

For purposes of illustration, FIG. 6C illustrates a bearing (generally designated 33) shape that may be produced by rolling and flanging of an appropriately dimensioned piece of composite material 1000, 1001, 1002, 1003 which may be initially present as a blank as described above. FIG. 6C may include all of the structure and design of FIGS. 6A and 6B and, for sake of brevity, the corresponding reference numerals were kept the same and refer to the same structures as those of FIGS. 6A and 6B. FIG. 6C may differ from FIG. 6B in that the bearing 33 of FIG. 6C may include a bearing sidewall 102 with a tapered cylindrical portion that can be formed by rolling a tapered portion and flanging an end.

For purposes of illustration, FIG. 6D illustrates a bearing (generally designated 34) shape that may be produced by rolling and flanging of an appropriately dimensioned piece of composite material 1000, 1001, 1002, 1003 which may be initially present as a blank as described above. FIG. 6D may include all of the structure and design of FIGS. 6A-6C and, for sake of brevity, the corresponding reference numerals were kept the same and refer to the same structures as those of FIGS. 6A-6C. FIG. 6D may differ from FIG. 6B in that the bearing 34 of FIG. 6D illustrates a flanged bearing 100 mounted in a housing (or second component 150) with a shaft pin (or first component 160) mounted through the flanged bearing 100 to form an assembly.

For purposes of illustration, FIG. 6E illustrates a bearing (generally designated 35) shape that may be produced by rolling and flanging of an appropriately dimensioned piece of composite material 1000, 1001, 1002, 1003 which may be initially present as a blank as described above. FIG. 6E may include all of the structure and design of FIGS. 3A-3D and, for sake of brevity, the corresponding reference numerals were kept the same and refer to the same structures as those of FIGS. 6A-6D. FIG. 6E may differ from FIG. 6B in that the bearing 100 of FIG. 6E illustrates a two-sided flanged bearing 100 mounted in a housing with a shaft pin mounted through the two-sided flanged bearing 100 to form an assembly. As shown in FIG. 6E, a radial flange 122 may be positioned at both axial ends of the bearing 100.

As shown in FIGS. 6A-6E, the bearing material may be formed from a blank as described above and include a substrate 1119 (e.g., spring steel) that may be curved into a ring-like (substantially annular) shape. The ends of the bearing 100 may not meet (e.g., it may be formed as a split ring), thereby leaving an axial gap. In other embodiments, the generally cylindrical sidewall may be curved so that the ends overlap with one another. In yet further embodiments, the bearing 100 may be a continuous, unbroken ring. The bearing 100 may further include a sliding layer 1104 that conforms to the shape of the ring, as formed as a sliding layer 1104 from the blank of composite material 1000, 1001, 1002, 1003 as described above. The inner surface of the bearing 100 may have a sliding layer 1104 that conforms to the shape of the bearing 100 with the substrate 1119 forming the outer surface 132, as formed from the composite material 1000, 1001, 1002, 1003 as described above. Alternatively, or additionally, the outer surface of the bearing 100 may have a sliding layer 1104 that conforms to the shape of the bearing 100 with the substrate 1119 forming the inner surface, as formed from the composite material 1000, 1001, 1002, 1003 as described above. In other embodiments, the sliding layer 1104 may be laminated onto both surfaces of the ring.

In operation, the bearing 100 may be located adjacent to an opposing component such as a first component or a second component, such as in an assembly as described above. In operation, the bearing 100 may be located between two opposing (mating) components. For example, it may be located in the annular space between a first component (e.g., a shaft) and a bore in a second component (e.g., a housing). The first or second component may be made of any materials known in the art including, but not limited to, aluminum, magnesium, zinc, iron, or an alloy thereof. The surface roughness of the opposing component can be at least about 0.01 micron, at least about 0.02 micron, at least about 0.05 micron, at least about 0.1 micron, at least about 0.5 micron, at least about 1 micron, at least about 2 microns, at least about 5 microns, at least about 10 microns, at least about 20 microns, at least about 50 microns, at least about 100 microns, at least about 200 microns, or at least about 400 microns. In other embodiments, the surface roughness may be less than about 400 microns, less than about 200 microns, less than about 100 microns, less than about 50 microns, less than about 25 microns, less than about 20 microns, less than about 15 microns, less than about 10 microns, less than about 5 microns, less than about 3 microns, less than about 2 microns, or even less than about 1 micron. In yet another embodiment, the opposing component can have a surface roughness in the range from about 0.1 micron to about 400 microns, from about 0.5 micron to about 100 microns, or from about 1 micron to about 50 microns. In a particular embodiment, the surface of at least one of the first component or the second component has a surface roughness of less than 0.4 microns. At least one of the inner or outer of the bearing 100 may contact the opposing component to create a sliding interface.

In at least one embodiment, the assembly may include a lubricant on any of its components. In at least one embodiment, the lubricant may include a grease including at least one of lithium soap, lithium disulfide, graphite, mineral or vegetable oil, silicone grease, fluorether-based grease, apiezon, food-grade grease, petrochemical grease, or may be a different type. In at least one embodiment, the lubricant may include an oil including at least one of a Group I-GroupIII+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based oil, PTFE thickened grease or may be a different type. In at least one embodiment, the lubricant may include a solid based lubricant including at least one of lithium soap, graphite, boron nitride, molybdenum disulfide, tungsten disulfide, polytetrafluoroethylene, a metal, a metal alloy, or may be a different type. In a number of embodiments, the grease may be present on at least 25% of the total surface area of the bearing. In a number of embodiments, the nadirs in the sliding layer may contain or house the grease, as discussed in more detail below.

As a result of embodiments herein, an assembly is formed. The assembly may include a first component; a second component; and a bearing 100 located between the first component 306 and the second component 302, the bearing 100 including a substrate 1119, and a textured sliding layer 1104, where the sliding layer 1104 includes asperities including a plurality of apexes 22 and nadirs 21, where the minimum distance between at least one apex 22 of the plurality of apexes 22 and at least one nadir 21 of the plurality of nadirs 21 may be 0.05 mm, where the sliding layer 1104 induces formation of a film when engaged in a rotational interface w/ another component.

The assembly may in some embodiments be an exemplary hinge assembly, such as an automotive door hinge, hood hinge, tailgate hinge, engine compartment hinge, and the like. Applications for embodiments include, for example, assemblies for hinges and other vehicle components. Further, use of the sliding material or assembly may provide increased benefits in several applications such as, but not limited to, door, hood, tailgate, and engine compartment hinges, seats, steering columns, flywheels, driveshaft assemblies, powertrain applications (such as belt tensioners), or other types of applications. According to embodiments herein, the sliding material may allow for retention of grease and/or higher flow rates of grease at a bearing component interface, resulting in more consistent friction (e.g., coefficient of friction) over the lifetime of the bearing/assembly. Further, the sliding material may provide a textured surface to reduce unwanted stiction and stick slip phenomena for greases within the assembly. The sliding material may maintain a boundary condition between the bearing and another component that increases bearing life within the assembly. The sliding material or bearing according to embodiments herein may provide improved performance within high temperature, high stiffness environments and be able withstand higher pressure and velocity within the assembly. The sliding material or bearing according to embodiments herein may surprisingly provide optimal surface texture to retain grease in an assembly over neighboring materials while providing consistent coefficient of friction performance over existing sliding materials or bearings. The sliding material or bearing according to embodiments herein may perform within high better wear resistance with or without lubrication within the assembly.

EXAMPLES

The sliding material (applied to a bearing) according to embodiments herein was tested under several conditions showing the material achieved improved target friction and friction control over lifetime. The assembly was tested with a rotating load about the full circumference of as shown in Table 1 below, the sliding material was place in several proposed assemblies according to embodiments herein:

TABLE 1

| Variable | Seat Recliner | HVAC | Low Pinion Gear |
|---|---|---|---|
| Load direction | Rotating load above the full circumference of bearing ID | | |
| Lubrication | Grease | Oil | Grease |
| Application Temp. | −40 C.-80 C. | −40 C.-150 C. | −40 C.-120 C. |
| Max. load (P) | <25 MPa | <9 MPa | <40 MPa |
| Max. velocity (V) | <0.25 m/s | <9 m/s | <0.05 m/s |
| Max. PV | <6 MPa · m/s | <60 MPa · m/s | <2 MPa · m/s |
| Lifetime requirement | 8,000-30,000 cycles | ~2,000 hrs | N/A |

Further, the sliding material (applied to a bearing) (A) was tested against a bearing with a sliding material known in the art (B) using several testing methods: 1) Journal Bearing Testing (Standard lubrication testing at different temps & Stribeck testing with grease); 2) Pin-on-disc testing at high PV; 3) Seat Recliner Testing; 4) JPT testing at high temperature for HVAC application; and 5) JBT testing for lower pinion gear application.

Figure 7:
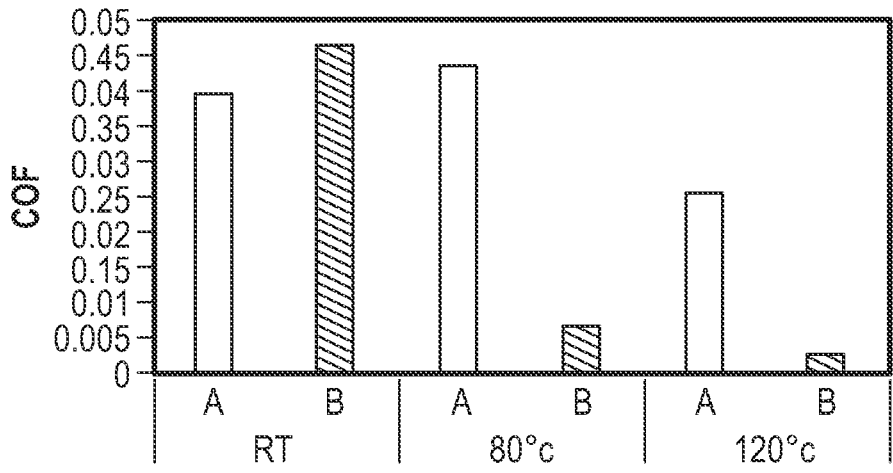
FIG. 7 includes a comparison of the bearing with a sliding material (A) according to embodiments herein against a bearing with a sliding material known in the art (B) under Journal Bearing Testing.
Figure 8:
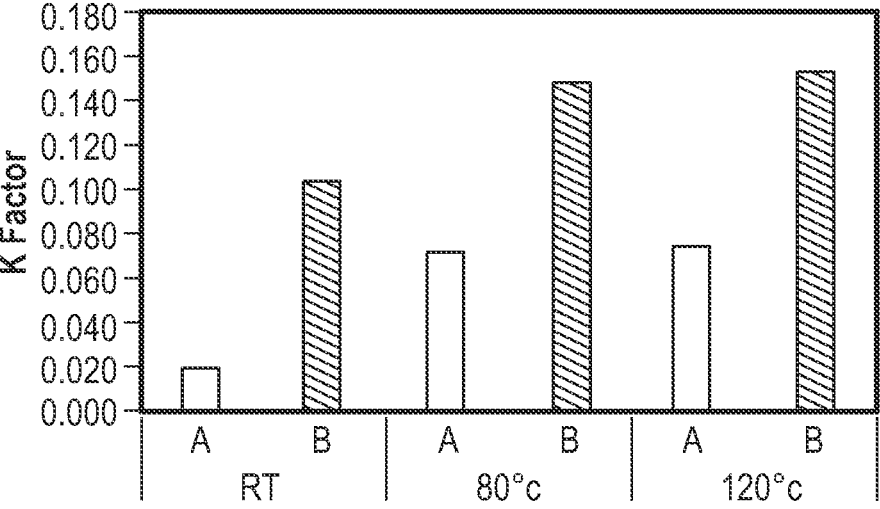
FIG. 8 includes a comparison of the bearing with a sliding material (A) according to embodiments herein against a bearing with a sliding material known in the art (B) under Journal Bearing Testing.

In the Journal Bearing Testing, the bearing was placed between a test shaft and a test housing with data collection on bearing torque, motor torque, temperature, and speed. FIGS. 7 and 8 show a comparison of the bearing with a sliding material (A) according to embodiments herein against a bearing with a sliding material known in the art (B) under Journal Bearing Testing under coefficient of friction and K Factor. As shown, the bearing with a sliding material according to embodiments herein (A) shows more wear resistance against a bearing with a sliding material known in the art (B) at room temperature, 80° C., and 120° C.

Figure 9:
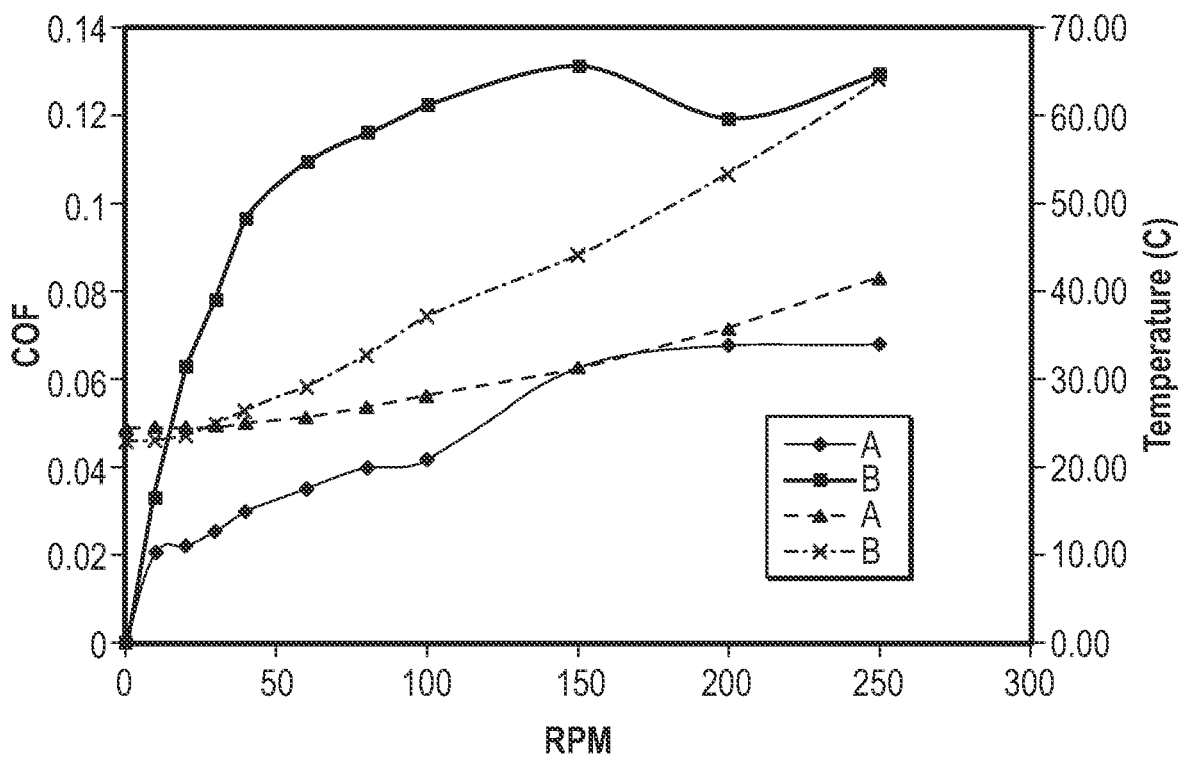
FIG. 9 includes a comparison of the bearing with a sliding material (A) according to embodiments herein against a bearing with a sliding material known in the art (B) under Journal Bearing Testing.

In the Journal Bearing Testing, the bearing was placed between a test shaft and a test housing with data collection on bearing torque, motor torque, temperature, and speed. FIG. 9 shows a comparison of the bearing with a sliding material (A) according to embodiments herein against a bearing with a sliding material known in the art (B) under Journal Bearing Testing under Stribeck testing with a 3000 lb load and variable RPM, Temperature, and coefficient of friction. As shown, the bearing with a sliding material according to embodiments herein (A) shows more wear resistance against a bearing with a sliding material known in the art (B) at different Temperatures and coefficient of friction values.

Figure 10:
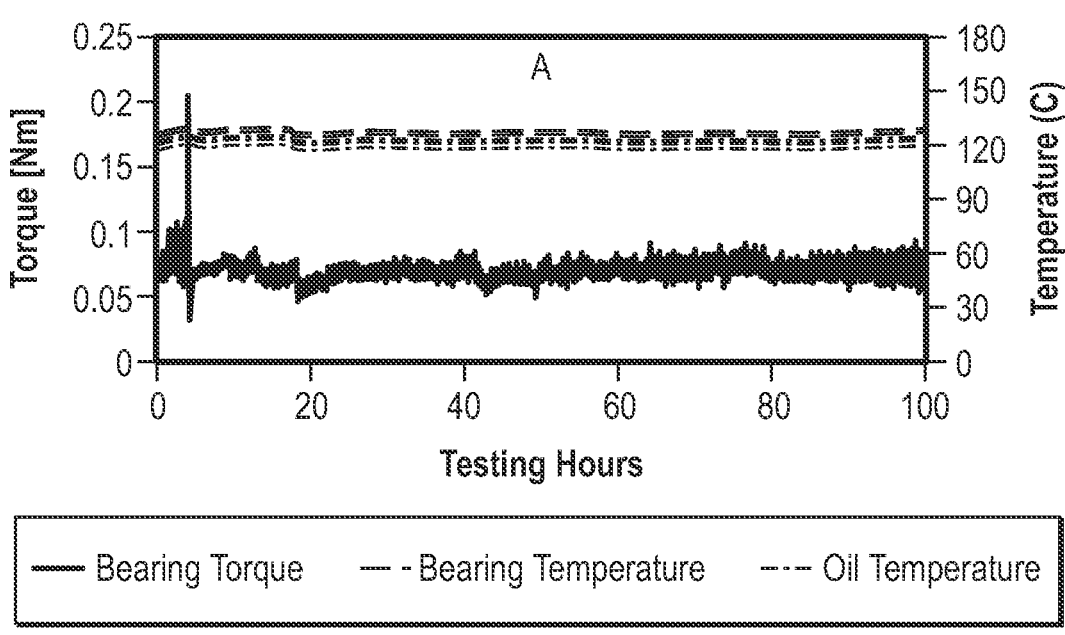
FIG. 10 includes a comparison of the bearing with a sliding material (A) according to embodiments herein against a bearing with a sliding material known in the art (B) under Journal Bearing Testing.
Figure 11:
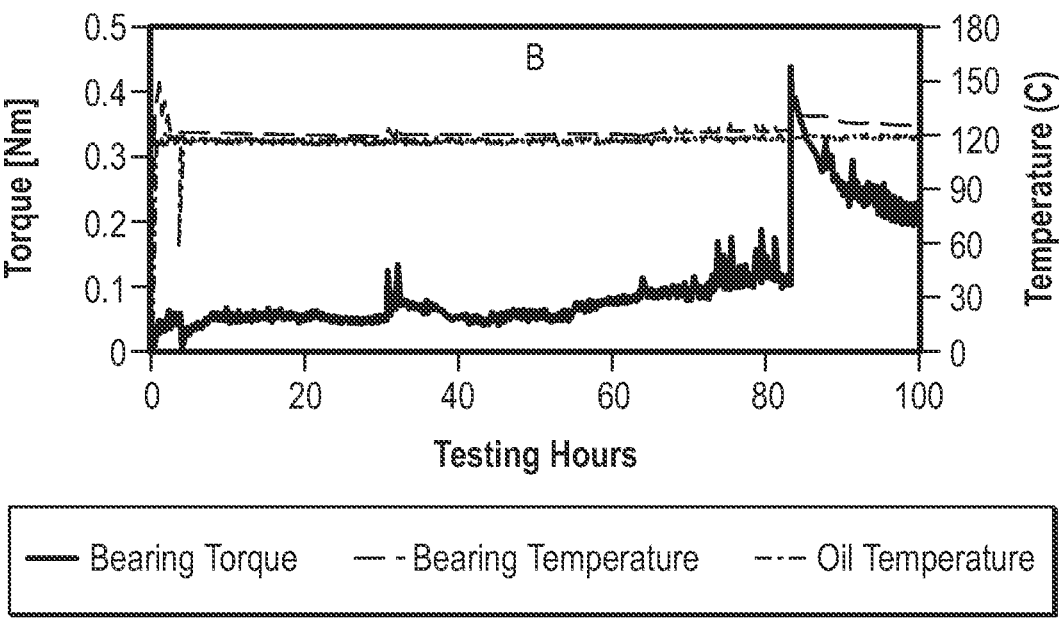
FIG. 11 includes a comparison of the bearing with a sliding material (A) according to embodiments herein against a bearing with a sliding material known in the art (B) under Journal Bearing Testing.

In the Journal Bearing Testing, the bearing was placed between a test shaft and a test housing with data collection on High PVT (120 C) conditions with oil. FIGS. 10 and 11 show a comparison of the bearing with a sliding material (A) according to embodiments herein against a bearing with a sliding material known in the art (B) under Journal Bearing Testing under different torque, temperature, and oil temperature values. As shown, the bearing with a sliding material according to embodiments herein (A) shows less wear depth against a bearing with a sliding material known in the art (B) at different Temperatures for the oil and bearing and torque values.

Figure 12:
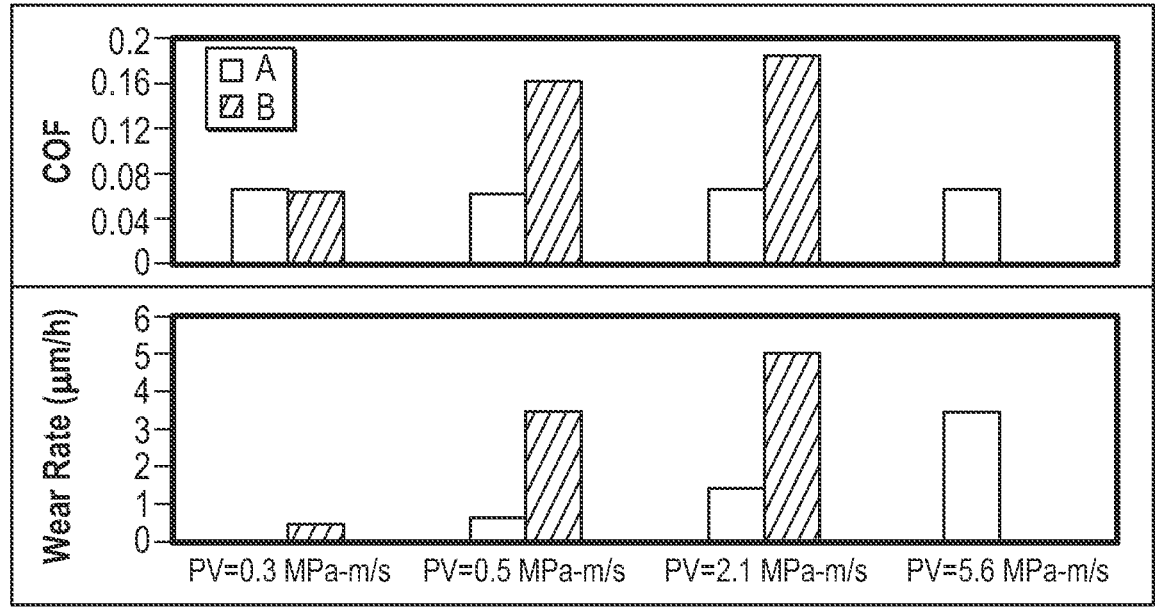
FIG. 12 includes a comparison of the bearing with a sliding material (A) according to embodiments herein against a bearing with a sliding material known in the art (B) under Pin-on-disc testing.

In the Pin-on-disc testing at high PV, the bearing was placed between a test shaft and a test housing with data collection on bearing torque, motor torque, temperature, and speed. FIG. 12 shows a comparison of the bearing with a sliding material (A) according to embodiments herein against a bearing with a sliding material known in the art (B) under Pin-on-disc testing with 23° C. temperature, 25 mm stroke length, and grease lubricated with variable PV, wear rate, and coefficient of friction. As shown, the bearing with a sliding material according to embodiments herein (A) shows more wear resistance against a bearing with a sliding material known in the art (B).

In the Recliner testing, the bearing tested in a seat recliner system under 3200 cycles lock-to lock, 2 minutes per cycle, and under 1000 lb load in the seat. The bearing with a sliding material according to embodiments herein (A) shows better tribological behavior regarding stick slip/stiction/dynamic friction/and wear against a bearing with a sliding material known in the art (B).

In the JPT testing at high temperature for HVAC application, the bearing tested in a HVAC application using POE oil fully submerged at 6000 RPM under 8 MPa load. As shown, the bearing with a sliding material according to embodiments herein (A) shows more wear resistance and improved bond strength against a bearing with a sliding material known in the art (B).

In the JBT testing for lower pinion gear application, the bearing tested in grease conditions. The test parameters were 130 hours using Molywhite LSG grease under a 29 MPa load at 32 RPM under 80° C. As shown, the bearing with a sliding material according to embodiments herein (A) shows more wear resistance against a bearing with a sliding material known in the art (B).

The journal bearing testing may be further used to determine surface texture parameters. The journal bearing test may test a sliding material of smooth surface texture (T). The smooth surface texture may have low coefficient off friction, be able to operate in hydrodynamic conditions, but has poor liquid retention with a neighboring component in operation. The journal bearing may test a sliding material of rough surface texture (R). The rough surface texture may have a high coefficient of friction but may only be capable of thin boundary liquid lubrication with a neighboring component in operation. The journal bearing may test the sliding material according to embodiments herein (P).

A high frequency oscillator test may be further used to determine surface texture parameters. The high frequency oscillator test may test a sliding material of smooth surface texture (T). The smooth surface texture may have low coefficient off friction, be able to operate in hydrodynamic conditions, but has poor liquid retention with a neighboring component in operation. The high frequency oscillator test may test a sliding material of rough surface texture (R). The rough surface texture may have a high coefficient of friction but may only be capable of thin boundary liquid lubrication with a neighboring component in operation. The high frequency oscillator test may test the sliding material according to embodiments herein (P).

Figure 13:
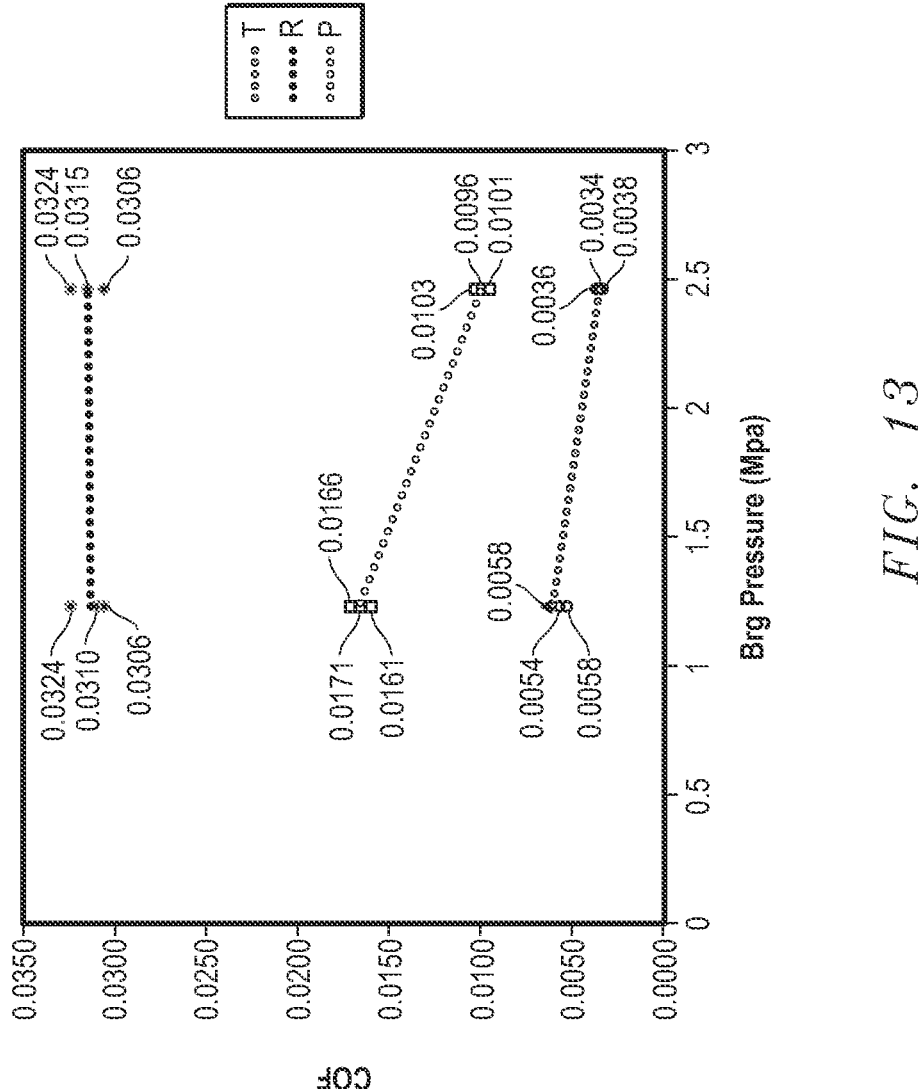
FIG. 13 includes a comparison of the coefficient of friction of a bearing with a sliding material (P) according to embodiments herein against a bearing with sliding materials known in the art (T, P) undergoing testing under increasing pressure.

FIG. 13 is a chart of sliding materials coefficient of friction against a smooth shaft over increasing pressure under the journal bearing test. The sliding material may be rotated at 10 rpm (0.01 m/s) with a smooth shaft (surface roughness less than 0.06 μm) with grease including PTFE acting as a liquid. As shown in FIG. 13, with increased pressure the sliding material (P) according to embodiments herein trends negatively similar to a smooth surface, suggesting hydrodynamic pressure is generated with hydrodynamic lubrication (e.g., fluid film formation), unlike the rough surface texture sliding material (R). The data shows that fluid film is generated in the sliding material (P) due to the lowered coefficient of friction with the increasing pressure. The sliding material (P) shows a negative slope, indicating fluid film formation between the sliding material (P) and a neighboring component, unlike existing sliding materials.

Figure 14:
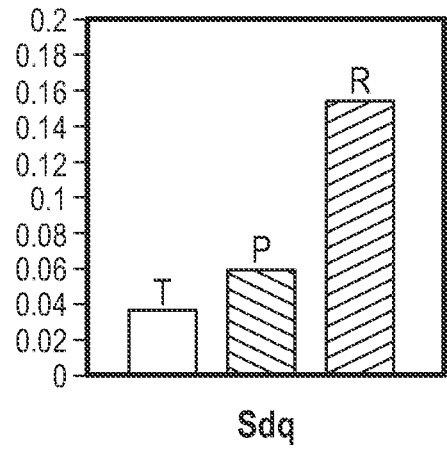
FIG. 14 includes a comparison of the root mean square gradient of a bearing with a sliding material (P) according to embodiments herein against a bearing with sliding materials known in the art (T, P)

FIG. 14 is a chart of sliding materials coefficient of friction related to root mean square gradient (SDQ) as described above. As shown in FIG. 14, with SDQ of the sliding material according to embodiments herein shows an optimal gradient for generating hydrodynamic pressure with a low coefficient of friction at less than 0.064. This value shows optimal coefficient of friction over existing sliding materials due to film formation, as described above regarding FIG. 13. Further, this value shows optimal grease retention over existing sliding materials, as described above regarding FIGS. 17-18.

Figure 15:
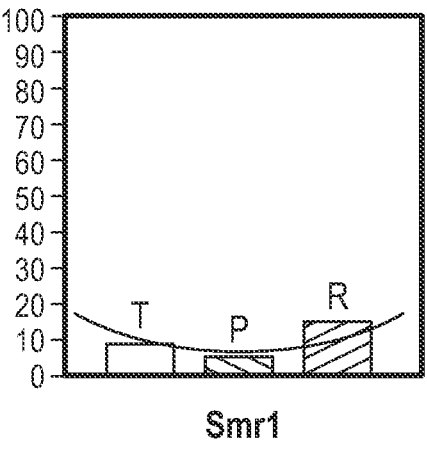
FIG. 15 includes a comparison of the apex material portion of a bearing with a sliding material (P) according to embodiments herein against a bearing with sliding materials known in the art (T, P)

FIG. 15 is a chart of sliding materials related to apex material portion percentage as described above. As shown in FIG. 15, with apex material portion of the sliding material according to embodiments herein shows an optimal percentage for generating hydrodynamic pressure at less than 10%. This value shows optimal grease retention and bearing pressure over existing sliding materials due to film formation, as described above regarding FIG. 13. Further, this value shows optimal grease retention over existing sliding materials, as described above regarding FIGS. 17-18.

Figure 16:
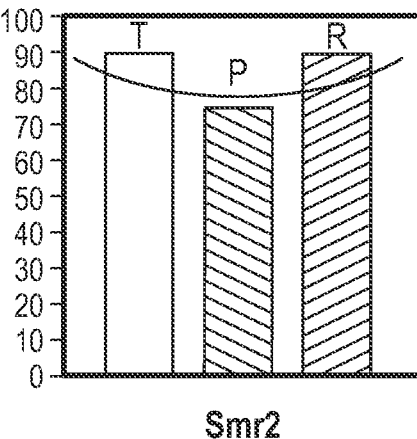
FIG. 16 includes a comparison of the nadir material portion of a bearing with a sliding material (P) according to embodiments herein against a bearing with sliding materials known in the art (T, P)

FIG. 16 is a chart of sliding materials related to nadir material portion percentage as described above. As shown in FIG. 16, with nadir material portion of the sliding material according to embodiments herein shows an optimal percentage for generating hydrodynamic pressure at less than 75%. This value shows optimal grease retention and bearing pressure over existing sliding materials due to film formation, as described above regarding FIG. 13. Further, this value shows optimal grease retention over existing sliding materials, as described above regarding FIGS. 17-18.

Figure 17:
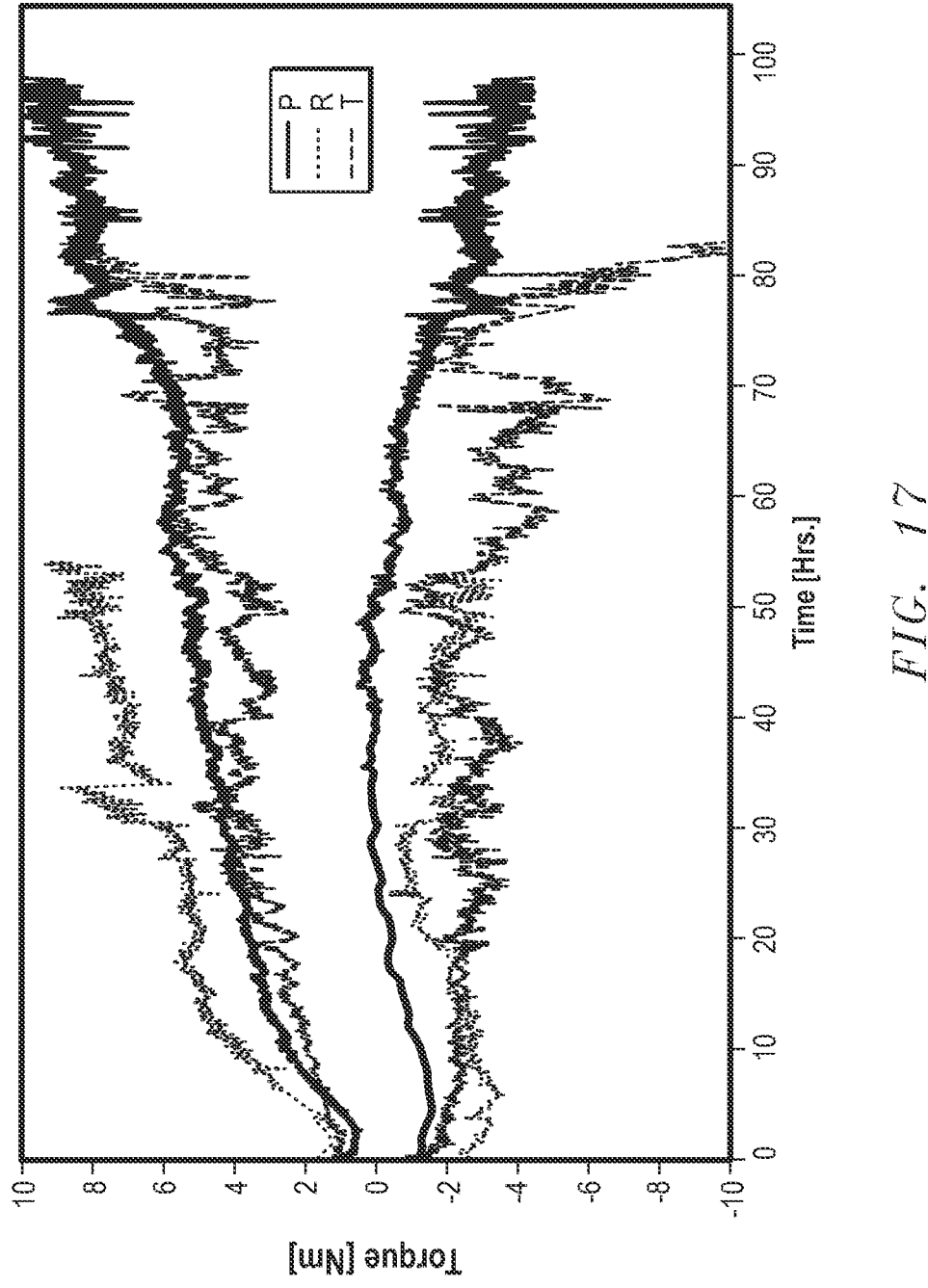
FIG. 17 includes a comparison of the torque of a bearing with a sliding material (P) according to embodiments herein against a bearing with sliding materials known in the art (T, P) undergoing testing under over time.

FIG. 17 is a chart of sliding materials torque trend as a function of time under high frequency oscillation testing (25 Hz, +/−10 deg., Constant PV=0.70 MPA×m/s with grease including PTFE). As shown in FIG. 17, the sliding material (P) according to embodiments herein exhibits the lowest, most constant torque due to optimal grease retention and coefficient of friction. This value shows optimal temperature performance due to the torque performance. Also shown is that the longer lifetime of the sliding material (P) indicates grease retention optimization versus existing sliding materials.

Figure 18:
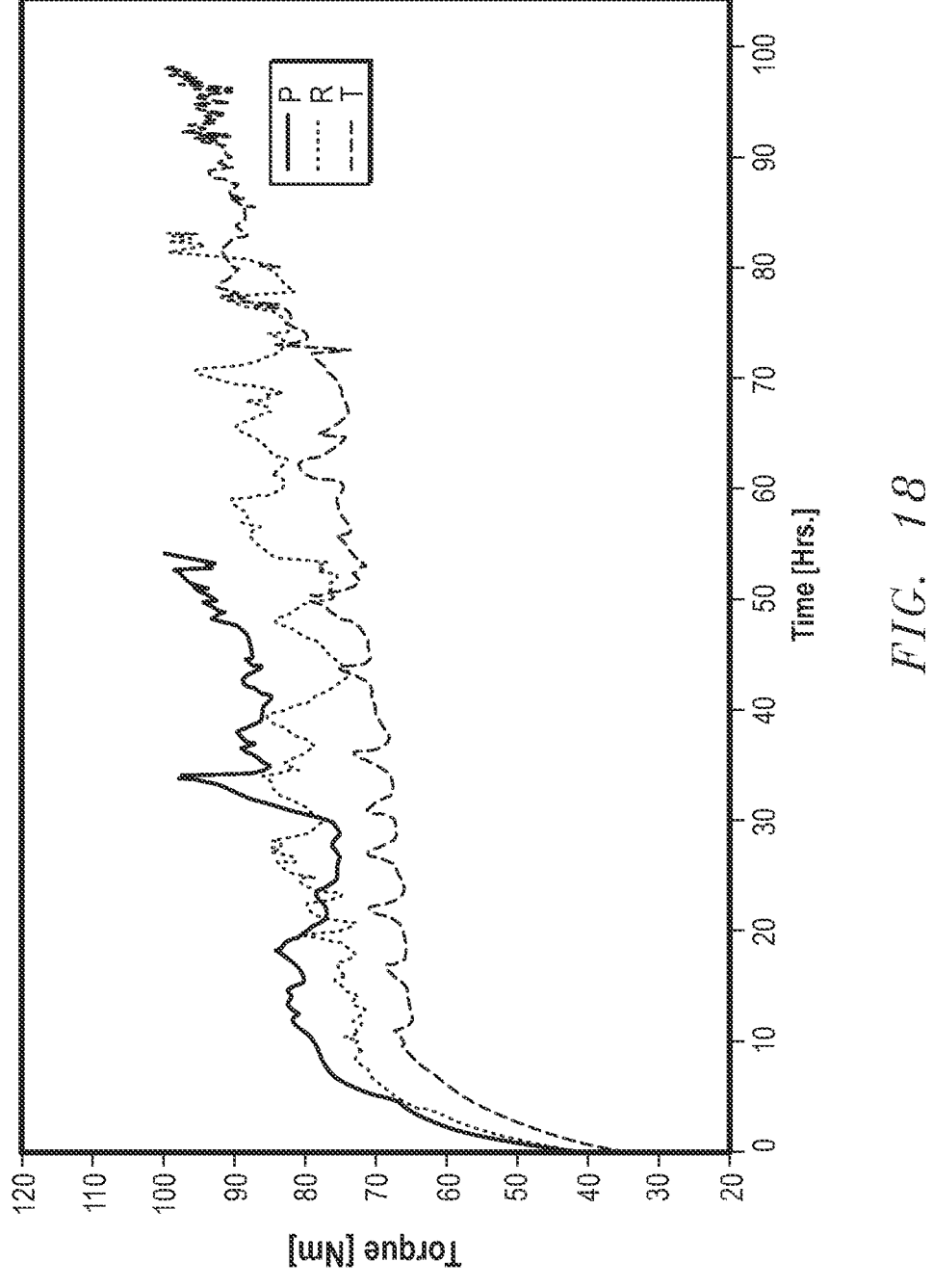
FIG. 18 includes a comparison of the torque of a bearing with a sliding material (P) according to embodiments herein against a bearing with sliding materials known in the art (T, P) undergoing testing over time.

FIG. 18 is a chart of sliding materials temperature trend as a function of time under high frequency oscillation testing (25 Hz, +/−10 deg., Constant PV=0.70 MPA×m/s with grease including PTFE) As shown in FIG. 18, the sliding material (P) according to embodiments herein exhibits the lowest temperature over use due to optimal grease retention and coefficient of friction. This value shows optimal temperature performance due to the torque performance. Also shown is that the longer lifetime of the sliding material (P) indicates grease retention optimization versus existing sliding materials.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A sliding material comprising: a substrate, and a textured sliding layer overlying the substrate, wherein the sliding layer comprises asperities comprising a plurality of apexes and nadirs, wherein the sliding layer has a root mean square gradient of less than 0.064, wherein the textured sliding layer induces formation of a film when engaged in a rotational interface w/ another component.

Embodiment 2: A sliding material comprising: a substrate, and a textured sliding layer overlying the substrate, wherein the sliding layer comprises asperities comprising a plurality of apexes and nadirs, wherein the sliding layer has an apex material portion of less than 10% wherein the textured sliding layer induces formation of a film when engaged in a rotational interface w/ another component.

Embodiment 3: A sliding material comprising: a substrate, and a textured sliding layer overlying the substrate, wherein the sliding layer comprises asperities comprising a plurality of apexes and nadirs, wherein the sliding layer has a nadir material portion of less than 75%, wherein the textured sliding layer induces formation of a film when engaged in a rotational interface w/ another component.

Embodiment 4: A bearing comprising: a substrate, and a textured sliding layer overlying the substrate, wherein the sliding layer comprises asperities comprising a plurality of apexes and nadirs, wherein the sliding layer has a root mean square gradient of less than 0.064, wherein the textured sliding layer induces formation of a film when engaged in a rotational interface w/another component.

Embodiment 5: A bearing comprising: a substrate, and a textured sliding layer overlying the substrate, wherein the sliding layer comprises asperities comprising a plurality of apexes and nadirs, wherein the sliding layer has an apex material portion of less than 10% wherein the textured sliding layer induces formation of a film when engaged in a rotational interface w/another component.

Embodiment 6: A bearing comprising: a substrate, and a textured sliding layer overlying the substrate, wherein the sliding layer comprises asperities comprising a plurality of apexes and nadirs, wherein the sliding layer has a nadir material portion of less than 75%, wherein the textured sliding layer induces formation of a film when engaged in a rotational interface w/another component.

Embodiment 7: An assembly comprising: a first component; a second component; and a bearing located between the first component and the second component, the bearing comprising: a substrate, and a textured sliding layer overlying the substrate, wherein the sliding layer comprises asperities comprising a plurality of apexes and nadirs, wherein the sliding layer has a root mean square gradient of less than 0.064, wherein the textured sliding layer induces formation of a film when engaged in a rotational interface w/ another component.

Embodiment 8: An assembly comprising: a first component; a second component; and a bearing located between the first component and the second component, the bearing comprising: a substrate, and a textured sliding layer overlying the substrate, wherein the sliding layer comprises asperities comprising a plurality of apexes and nadirs, wherein the sliding layer has an apex material portion of less than 10% wherein the textured sliding layer induces formation of a film when engaged in a rotational interface w/ another component.

Embodiment 9: An assembly comprising: a first component; a second component; and a bearing located between the first component and the second component, the bearing comprising: a substrate, and a textured sliding layer overlying the substrate, wherein the sliding layer comprises asperities comprising a plurality of apexes and nadirs, wherein the sliding layer has a nadir material portion of less than 75%, wherein the textured sliding layer induces formation of a film when engaged in a rotational interface w/ another component.

Embodiment 10: A method comprising: providing a substrate; applying a sliding layer to the substrate to provide a laminate with a textured sliding layer overlying the substrate, wherein the sliding layer comprises asperities comprising a plurality of apexes and nadirs, wherein the sliding layer has a root mean square gradient of less than 0.064, wherein the textured sliding layer induces formation of a film when engaged in a rotational interface w/ another component.

Embodiment 11: A method comprising: providing a substrate; applying a sliding layer to the substrate to provide a laminate with a textured sliding layer overlying the substrate, wherein the sliding layer comprises asperities comprising a plurality of apexes and nadirs, wherein the sliding layer has an apex material portion of less than 10% wherein the textured sliding layer induces formation of a film when engaged in a rotational interface w/ another component.

Embodiment 12: A method comprising: providing a substrate; applying a sliding layer to the substrate to provide a laminate with a textured sliding layer overlying the substrate, wherein the sliding layer comprises asperities comprising a plurality of apexes and nadirs, wherein the sliding layer has a nadir material portion of less than 75%, wherein the textured sliding layer induces formation of a film when engaged in a rotational interface w/ another component.

Embodiment 13: The bearing, assembly, or method according to any one of the preceding embodiments, wherein the surface of the component has a surface roughness of less than 0.4 microns.

Embodiment 14: The bearing, assembly, or method according to any one of the preceding embodiments, wherein the substrate comprises a porous metallic is selected from a mesh material, a grid, an expanded sheet, or a perforated sheet.

Embodiment 15: The bearing, assembly, or method according to any one of the preceding embodiments, wherein the substrate includes aluminum, magnesium, zinc, iron, or an alloy thereof.

Embodiment 16: The assembly according to any one of embodiments 3-4, wherein the surface of at least one of the first component or the second component includes aluminum, magnesium, zinc, iron, or an alloy thereof.

Embodiment 17: The bearing, assembly, or method according to any one of the preceding embodiments, wherein the sliding layer comprises a fluoroploymer.

Embodiment 18: The bearing, assembly, or method according to any one of the preceding embodiments, wherein the sliding layer comprises a polytetrafluoroethylene (PTFE), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), polyoxymethylene (POM), polyethylene (PE), UHMWPE, or a mixture thereof.

Embodiment 19: The bearing, assembly, or method according to any one of the preceding embodiments, wherein the sliding layer comprises an organic filler comprising polytetrafluoroethylene (PTFE), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), polyoxymethylene (POM), polyethylene (PE), UHMWPE, ethylene propylene diene, or a mixture thereof.

Embodiment 20: The bearing, assembly, or method according to any one of the preceding embodiments, wherein the sliding layer has a thickness of at least about 0.05 mm, such as at least about 0.1 mm, at least about 0.15 mm, at least about 0.2 mm, at least about 0.25 mm, at least about 0.3 mm, at least about 0.35 mm, at least about 0.4 mm, or at least about 0.45 mm.

Embodiment 21: The bearing, assembly, or method according to any one of the preceding embodiments, wherein the sliding layer has a thickness of not greater than about 5 mm, not greater than about 4 mm, not greater than about 3 mm, not greater than about 2.5 mm, not greater than about 2 mm, such as not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm.

Embodiment 22: The bearing, assembly, or method according to any one of the preceding embodiments, wherein the substrate has a thickness of at least about 0.05 mm, such as at least about 0.1 mm, at least about 0.15 mm, at least about 0.2 mm, at least about 0.25 mm, at least about 0.3 mm, at least about 0.35 mm, at least about 0.4 mm, or at least about 0.45 mm.

Embodiment 23: The bearing, assembly, or method according to any one of the preceding embodiments, wherein the substrate has a thickness of not greater than about 5 mm, not greater than about 4 mm, not greater than about 3 mm, not greater than about 2.5 mm, not greater than about 2 mm, such as not greater than about 1.5 mm, not greater than about 1 mm, not greater than about 0.9 mm, not greater than about 0.8 mm, not greater than about 0.7 mm, not greater than about 0.6 mm, not greater than about 0.55 mm, or not greater than about 0.5 mm.

Embodiment 24: The bearing, assembly, or method according to any one of the preceding embodiments, wherein the substrate is embedded in the sliding layer.

Embodiment 25: A method according to any one of embodiments 10-12, further comprising: cutting a blank from the laminate; and forming a semi-finished bearing from the blank.

Embodiment 26: The assembly according to any one of embodiments 7-9, wherein the assembly further comprises a grease.

Embodiment 27: The assembly according to embodiment 26, wherein the grease comprises polytetrafluoroethylene.

Embodiment 28: The assembly according to embodiment 26, wherein the nadirs in the sliding layer contain the grease.

Embodiment 29: The assembly according to embodiment 26, wherein the grease is present on at least 25% of the total surface area of the bearing.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of assembly and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A sliding material comprising:
   a substrate, and
   a textured sliding layer overlying the substrate, wherein the textured sliding layer comprises asperities comprising a plurality of apexes and nadirs, wherein the textured sliding layer has an apex material portion of less than 10% and a nadir material portion of less than 75%, wherein the textured sliding layer has a root mean square gradient of less than 0.064, and wherein the textured sliding layer induces formation of a film when engaged in a rotational interface with another component.

2. An assembly comprising:
   a first component;
   a second component; and
   a bearing located between the first component and the second component, the bearing comprising:
     a substrate, and
     a textured sliding layer overlying the substrate, wherein the textured sliding layer comprises asperities comprising a plurality of apexes and nadirs, wherein the textured sliding layer has an apex material portion of less than 10% and a nadir material portion of less than 75%, wherein the textured sliding layer has a root mean square gradient of less than 0.064, and wherein the textured sliding layer induces formation of a film when engaged in a rotational interface with another component.

3. The sliding material according to claim 1, wherein the surface of the component has a surface roughness of less than 0.4 microns.

4. The sliding material according to claim 1, wherein the substrate comprises a porous metallic selected from a mesh material, a grid, an expanded sheet, or a perforated sheet.

5. The sliding material according to claim 1, wherein the substrate includes aluminum, magnesium, zinc, iron, or an alloy thereof.

6. The sliding material according to claim 1, wherein the surface of the component includes aluminum, magnesium, zinc, iron, or an alloy thereof.

7. The sliding material according to claim 1, wherein the textured sliding layer comprises a fluoroploymer.

8. The sliding material according to claim 1, wherein the textured sliding layer comprises a polytetrafluoroethylene (PTFE), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), polyoxymethylene (POM), polyethylene (PE), UHMWPE, or a mixture thereof.

9. The sliding material according to claim 1, wherein the textured sliding layer comprises an organic filler comprising polytetrafluoroethylene (PTFE), a polyamide (PA), a polyether ether ketone (PEEK), a polyimide (PI), a polyamideimide (PAI), a polyphenylene sulfide (PPS), a polyphenylene sulphone (PPSO2), a liquid crystal polymers (LCP), perfluoroalkoxypolymer (PFA), polyoxymethylene (POM), polyethylene (PE), UHMWPE, ethylene propylene diene, or a mixture thereof.

10. The sliding material according to claim 1, wherein the textured sliding layer has a thickness of at least about 0.05 mm.

11. The sliding material according to claim 1, wherein the textured sliding layer has a thickness of not greater than about 5 mm.

12. The sliding material according to claim 1, wherein the substrate has a thickness of at least about 0.05 mm.

13. The sliding material according to claim 1, wherein the substrate has a thickness of not greater than about 5 mm.

14. The sliding material according to claim 1, wherein the substrate is embedded in the textured sliding layer.

15. The sliding material according to claim 1, wherein the sliding material is manufactured into a bearing by cutting a blank from the laminate; and forming a semi-finished bearing from the blank.

16. The assembly according to claim 2, wherein the assembly further comprises a grease.

17. The assembly according to claim 16, wherein the grease comprises polytetrafluoroethylene.

18. The assembly according to claim 16, wherein the nadirs in the textured sliding layer contain the grease.

19. The assembly according to claim 16, wherein the grease is present on 25% of the total surface area of the bearing.

\* \* \* \* \*